(12) United States Patent
Shimizu

(10) Patent No.: US 8,851,130 B2
(45) Date of Patent: Oct. 7, 2014

(54) TIRE HAVING ROWS OF BLOCK LAND PORTIONS, LATERAL GROOVES AND AT LEAST THREE CIRCUMFERENTIAL GROOVES

(75) Inventor: Akiyoshi Shimizu, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 993 days.

(21) Appl. No.: 12/602,405

(22) PCT Filed: May 28, 2008

(86) PCT No.: PCT/JP2008/059826
§ 371 (c)(1),
(2), (4) Date: Dec. 11, 2009

(87) PCT Pub. No.: WO2008/146851
PCT Pub. Date: Dec. 4, 2008

(65) Prior Publication Data
US 2010/0180997 A1 Jul. 22, 2010

(30) Foreign Application Priority Data

May 28, 2007 (JP) ................................. 2007-140896

(51) Int. Cl.
*B60C 11/11* (2006.01)
*B60C 11/12* (2006.01)
*B60C 11/03* (2006.01)

(52) U.S. Cl.
CPC ............. *B60C 11/11* (2013.01); *B60C 11/0306* (2013.01); *Y10S 152/902* (2013.01); *Y10S 152/03* (2013.01)
USPC .................. 152/209.27; 152/902; 152/DIG. 3

(58) Field of Classification Search
USPC .................... 152/209.17, 902, DIG. 3, 209.27
See application file for complete search history.

(56) References Cited

U.S. PATENT DOCUMENTS 4,320,790 A * 3/1982 Corner et al. ............ 152/209.27
6,000,450 A 12/1999 Kishimoto et al.
(Continued)

FOREIGN PATENT DOCUMENTS

EP 0 468 815 A1 1/1992
EP 468815 A * 1/1992
(Continued)

OTHER PUBLICATIONS

Machine translation for Japan 05-162512.*

(Continued)

*Primary Examiner* — Steven D Maki
(74) *Attorney, Agent, or Firm* — Sughrue Mion, PLLC

(57) ABSTRACT

An object the present invention is to provide a tire, in which wear resistance has been enhanced by optimizing the shape and location of block land portions. The tire has plural rows 5 of block land portions 4 formed by demarcation by providing plural circumferential grooves 2 extending along tire circumferential direction and plural lateral grooves 3 for communicating adjacent two circumferential grooves 2,2 with each other; in at least two rows 5 of block land portions adjacent to each other with a circumferential groove therebetween, among the rows 5 of block land portions 4, the respective rows 5 of block land portions 4 are disposed to be offset with respect to each other in the tire circumferential direction. The extending direction of the groove portion 6 between the block land portions adjacent to each other in the tire widthwise direction is inclined with respect to the tire widthwise direction and tire circumferential direction. A distance between the block land portions adjacent to each other in the tire widthwise direction $d_2$ is shorter than a distance $d_1$ between the block land portions adjacent to each other in the tire circumferential direction.

7 Claims, 13 Drawing Sheets

(56) References Cited

U.S. PATENT DOCUMENTS

| | | | | |
|---|---|---|---|---|
| 6,003,575 | A | * | 12/1999 | Koyama et al. .......... 152/209.27 |
| 6,527,023 | B1 | | 3/2003 | Takahashi |
| 6,761,197 | B2 | * | 7/2004 | Carra et al. ............. 152/209.27 |
| 2006/0102267 | A1 | * | 5/2006 | Takahashi et al. ....... 152/209.18 |

FOREIGN PATENT DOCUMENTS

| | | | | |
|---|---|---|---|---|
| EP | 0 469 816 | A2 | | 2/1992 |
| EP | 1 428 688 | A2 | | 6/2004 |
| EP | 1433623 | | | 6/2004 |
| IT | 1245773 | B | * | 10/1994 |
| JP | 03-136911 | A | | 6/1991 |
| JP | 05-162512 | A | * | 6/1993 |
| JP | 06-171318 | A | | 6/1994 |
| JP | H07172112 | A | | 7/1995 |
| JP | 07-242106 | A | | 9/1995 |
| JP | 09-136516 | A | | 5/1997 |
| JP | 2000233609 | | | 8/2000 |
| JP | 2001-253213 | A | | 9/2001 |
| JP | 2003118321 | A | | 4/2003 |
| JP | 2004-224131 | A | * | 8/2004 |
| JP | 2004-299592 | A | | 10/2004 |
| JP | 2005-297880 | A | | 10/2005 |
| JP | 2007038924 | A | | 2/2007 |
| JP | 2007-145209 | A | * | 6/2007 |
| JP | 2007-153275 | A | * | 6/2007 |
| JP | 2007153275 | A | | 6/2007 |
| JP | 2007-302071 | A | * | 11/2007 |
| WO | 2008/146851 | A1 | | 12/2008 |

OTHER PUBLICATIONS

Machine translation for Japan 2007-302071.*
Machine translation for Japan 2007-153275.*
Machine translation for Japan 2007-145209.*
Abstract for Italy 1,245,773.*
Machine translation for p. 13 lines 1-6 of Italy 1,245,773.*
Machine translation for Japan 2004-224131.*
Machine translation for Japan 2007-038924.*
Machine translation for Japan 2003-118321.*
Extended European Search Report issued in European Application No. 08776941.0-2425 / 2151334 dated Apr. 15, 2011 (6 pages).
Chinese Office Action issued in Chinese Application No. 200880024280.2 dated Mar. 17, 2011 (with translation) (16 pages).
Chinese Office Action issued in Chinese Application No. 200880024280.2 dated Dec. 31, 2011 (with translation) (14 pages).
International Search Report PCT/JP2008/059826, Sep. 2, 2008.
Chinese Office Action dated Sep. 27, 2012 issued in Chinese Patent Application No. 200880024280.2.
Japanese Office Action dated Jul. 31, 2012 issued in corresponding Patent Application No. 2009-516342.
European Office Action dated Feb. 28, 2013 issued in EP Patent Application No. 08776941.0-1760.
Chinese Office Action dated May 9, 2013 issued in Chinese Patent Application No. 200880024280.2.
Japanese Office Action dated May 7, 2013 issued in Japanese Patent Application No. 2009-516342.
Japanese Office Action dated Nov. 26, 2013, issued in Japanese Patent Application No. 2009-516342.
Japanese Office Action dated Apr. 8, 2014, issued in corresponding Japanese Patent Application No. 2009-516342.
Japanese Office Action dated Aug. 27, 2013, issued in Japanese Patent Application No. 2013-164366.
Chinese Office Action dated Oct. 22, 2013 issued in Chinese Patent Application No. 200880024280.2.
Chinese Office Action dated Aug. 4, 2014 issued in Chinese Patent Application No. 200880024280.2.

* cited by examiner

FIG. 9
(a)
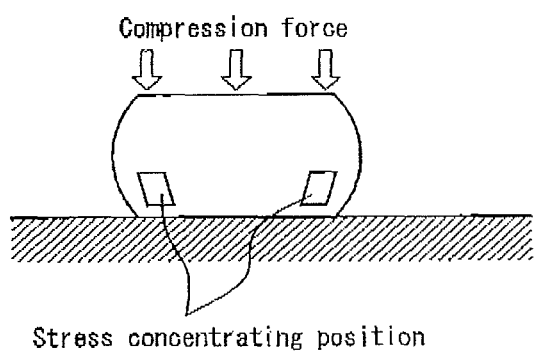
(b)
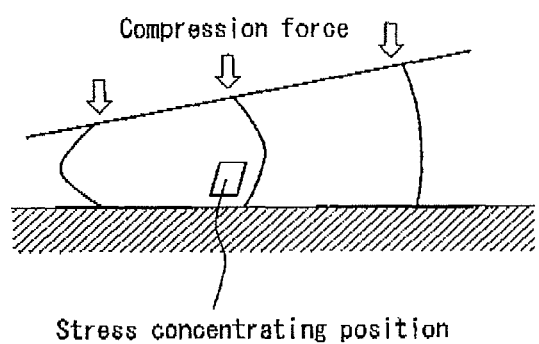

TIRE HAVING ROWS OF BLOCK LAND PORTIONS, LATERAL GROOVES AND AT LEAST THREE CIRCUMFERENTIAL GROOVES

CROSS REFERENCE TO RELATED APPLICATIONS

This application is a National Stage of International Application No. PCT/JP2008/059826 filed May 28, 2008, claiming priority based on Japanese Patent Application No. 2007-140896, filed May 28, 2007, the contents of all of which are incorporated herein by reference in their entirety.

TECHNICAL FIELD

The present invention relates to a tire having, in a tread portion, plural block land portion rows constituted of a large number of block land portions demarcated with plural circumferential grooves extending along tire circumferential direction and plural lateral grooves in communication with two adjacent circumferential grooves, in, particular, a tire for heavy load having such a tread construction. The present invention aims at enhancing wear resistance of the tire.

PRIOR ART

In general, a tire for heavy load has a relatively large aspect ratio and high rigidity of a belt to support considerable weight. Further, tread pattern is generally designed such that entire area of tread portion is provided with block land portions to enable the vehicles to run in various conditions.

A heavier load is exerted on the heavy load tire having such tread pattern as described above than a tire for vehicles in general. Therefore, uneven wear due to heel and toe wear tends to occur in running of the heavy load tire in proportion to the load exerted thereon. "Heel and toe wear" is relatively little wear loss at a leading edge (a portion brought into contact with the ground first) and relatively significant wear loss at a trailing edge (a portion brought into contact with the ground lastly), generated in the tire circumferential direction due to excessive deformation of the block land portions in rotation of the tire with a load exerted thereon. In view of this, there arises a problem that product life of tire with regard to wear is shortened due to occurrence of difference in wear in most cases between respective edges in the tire circumferential direction of each block land portion.

As countermeasures against uneven wear, a number of measures for suppressing uneven wear have been conventionally attempted. Examples of a presumably effective method include the method disclosed by JP 06-171318, in which a lateral groove demarcating block land portions is partially shallowed, i.e. a partially raised bottom portion is provided in the lateral groove, to enhance stress resisting collapse-deformation of block lad portions in the tire circumferential direction, suppress increase in driving force exerted per unit area of the tread portion and prevent uneven wear due to the collapse-deformation from occurring.

DISCLOSURE OF THE INVENTION

Problems to be Solved by the Invention

In general, since a tire for heavy load has a relatively large aspect ratio and high rigidity of belt, when the tire is rotated with a load exerted thereon, difference in displacement occurs between a belt portion and a tread portion, as shown in FIG. 1, due the rotation of the belt portion caused by driving force applied thereon and friction experienced by the tread portion in contact with the ground, whereby the tread portion collapse-deforms excessively. As a result, driving force exerted per unit area of the tread portion increases and "sliding phenomenon" of block land portions with respect to a road surface occurs, whereby an amount of wear in the block land portions increases due to the sliding phenomenon. The tire of JP06-171318 has a certain degree of advantage to prevent uneven wear, but can not suppress increase in an amount of wear in the block land portions due to the sliding phenomenon because collapse-deformation of the block land portions in rotation of the tire with a load exerted thereon cannot be sufficiently suppressed. Therefore, the problem of wear resistance still remains. In general, increasing rigidity of rubber composing the block land portions suppress excess collapse-deformation of block land portions, thereby effectively restricting the wear amount of the block land portions. However, increased rigidity of block land portions may lead to breakage of block land portions due to chipping and cracking thereof in rotation of the tire with a load exerted thereon.

Accordingly, an object of the present invention is to provide a tire in which wear resistance has been enhanced by optimizing the shape and location of the block land portion, while good uneven wear resistance is maintained.

Means for Solving the Problems

In order to achieve the aforementioned object, the present invention provides a tire having plural rows of block land portions constituted of a number of block land portions by demarcation by providing plural circumferential groove extending along tire circumferential direction and lateral grooves in communication with adjacent two circumferential grooves is characterized in that: in at least two rows of block land portions adjacent to each other with a circumferential groove therebetween the respective rows of block land portions are disposed to be offset with respect to each other in the tire circumferential direction; the extending direction of the groove portion between the block land portions adjacent to each other in the tire widthwise direction is inclined with respect to the tire widthwise direction and tire circumferential direction; and a distance between the block land portions adjacent to each other in the tire widthwise direction is shorter than a distance between the block land portions adjacent to each other in the tire circumferential direction. In the present invention, a "groove portion" represents a part of a circumferential groove extending between block land portions adjacent to each other in the tire widthwise direction, and being "disposed to be offset with respect to each other" represents differentiating starting points of disposure pitch in the tire circumferential direction of the block land portions adjacent to each other in the tire widthwise direction, with each other, so that the ends in the circumferential direction of one row of block land portions are not aligned with the ends in the circumferential direction of another row of block land portions adjacent to the one row in the tire widthwise direction.

In this regard, the inventor of the present invention has discovered that, as a is result of decrease in the ground-contact area in a tread surface caused by increase in belt rigidity, shear force in the circumferential direction in tread kicking-out situation, during which sliding wear may occur, excessively increases and wear resistance of the tire deteriorates accordingly. FIG. 2 shows change (from a state in which no driving force is exerted to a state in which driving force is applied on the tire) in shear force in the tire circumferential direction, i.e. a force in the tire driving direction acting on the ground contact surface of the tire, from stepping-in situation to kicking-out situation at a given position of a block land portion in contact with the a road surface. In a conventional tire, as shown in the solid line, shear force in the circumferential direction hardly exhibits any change from a state in which no driving force is exerted, in stepping-in situation, and then monotonously increases until kicking-out situation. The total sum of the forces generated in a period from the stepping-in situation to the kicking-out situation (the integral value of the shear force in the tire circumferential direction generated in a period from the stepping-in situation to the kicking-out situation) accelerates a vehicle as a force acting on the tire axis. In a case in which the ground contact area is decreased, decrease in the integral value caused by the decrease in the ground contact area is compensated by steep change or increase per unit area in a period from stepping-in situation to kicking-out situation, whereby shear force in the tire circumferential direction in kicking-out of a block increases and wear resistance deteriorates accordingly. There is an idea that, as shown in FIG. 2 by a broken line, the aforementioned problem or steep increase in shear force in the circumferential direction in kicking-out situation can be addressed or compensated by lowering shear force in the circumferential direction in kicking-out situation by making shear force in the circumferential direction be already generated at the stage of stepping-in situation (or causing change in shear force to occur already when no driving force is exerted yet). On this basis, the inventor, as a result of a keen study, discovered that: when driving force is exerted, a block land portion which has already been stepped-in experiences "floating" due to increase in shear deformation thereof, as shown in FIG. 3; and deformation of a next block land portion which is then pushed on a road surface increases due to the reaction of the aforementioned "floating", whereby a force is efficiently generated in the next block land portion in stepping-in situation and the characteristics as shown by the broken line in FIG. 2 can be demonstrated. It has also been discovered that this phenomenon can be effectively demonstrated by making block land portions closer to each other in the tire circumferential direction. However, when block land portions are made closer to each other in the tire circumferential direction, as shown in FIG. 4, a force in the same direction as the driving force in kicking-out situation is generated due to contact of block land portions with each other when these block land portions contact the ground, whereby wear resistance deteriorates. In view of this fact, the inventor searched a structure which can effectively utilize an action between block land portions and eliminate an effect caused by contact of the block land portions with each other in the tire circumferential direction, discovering the structure of present invention. Further, in the structure of present invention, the extending direction of the groove portion between the block land portions adjacent to each other in the tire widthwise direction is inclined with respect to the tire widthwise direction and the tire circumferential direction and the distance $d_2$ between block land portions adjacent to each other in the tire widthwise direction is shorter than the distance $d_1$ between block land portions adjacent to each other in the tire circumferential direction, significant driving force exerted per unit area can be efficiently generated at the state of stepping-in situation already by reaction between the block land portions, by utilizing the features that the groove portion between the block land portions adjacent to each other in the tire widthwise direction is inclined with respect to the tire circumferential direction and the tire widthwise direction and that the distance between the block land portions is relatively small, with suppressing the expanding component of rubber (see FIG. 4) due to contact of the block land portions adjacent in the tire circumferential direction with each other. As a result, the tangent of change in shear force in the circumferential direction in a period from stepping-in situation to kicking-out situation is made relatively small, whereby sliding wear can be effectively suppressed.

Yet further, a length of each block land portion in a section in the tire widthwise direction thereof preferably increases from the respective ends in the tire circumferential direction of the block land portion toward the center portion thereof. In the present invention, "the center portion of a block land portion" represents a region extending, by the length of 5 to 30% of the length in the tire circumferential direction of the block land portion, from the center position to the respective ends in the tire circumferential direction of the block land portion. In short, "the center portion of a block land portion" represents a region obtained by excluding, from an entire block land portion, areas ranging from the respective end portions in the tire circumferential direction to positions inward therefrom by 20% of the length of the block land portion in the tire circumferential direction.

Yet further, the ratio of a distance between block land portions adjacent to each other in the tire widthwise direction and a distance between block land portions adjacent to each other in the tire circumferential direction is preferably in the range of 1:0.85 to 1:0.3.

Yet further, the ratio of a distance between block land portions adjacent to each other in the tire circumferential direction and the length in the tire circumferential direction of a block land portion is preferably in the range of 1:0.25 to 1:0.05.

Yet further, the distance between the block land portions adjacent to each other in the tire widthwise direction is preferably in the range of 1.0 to 5.0 mm.

Yet further, the distance between the block land portions adjacent to each other in the tire circumferential direction is preferably in the range of 3.0 to 10.0 mm.

Yet further, the block land portion is preferably provided with a narrow groove which is in communication in the tire widthwise direction, with the two circumferential grooves each adjacent to the block land portion.

Yet further, the narrow groove provided in the block land portion preferably opens to the circumferential grooves at the center portion of the block land portion.

Yet further, the length in the tire circumferential direction of the narrow groove provided in the block land portion is preferably in the range of 5 to 20% of the groove depth of the lateral groove.

Effect of the Invention

According to the present invention, it is possible to provide a tire, in which wear resistance has been enhanced by optimizing the shape and location of the block land portions.

BRIEF DESCRIPTION OF THE DRAWINGS

FIG. 9(a) is a view showing a block land portion in contact with the ground due to being pushed horizontally with respect to a road surface. FIG. 9(b) is a view showing a block land portion in contact with the ground due to being pushed diagonally with respect to a road surface.

BEST MODE FOR CARRYING OUT THE INVENTION

Figure 5:
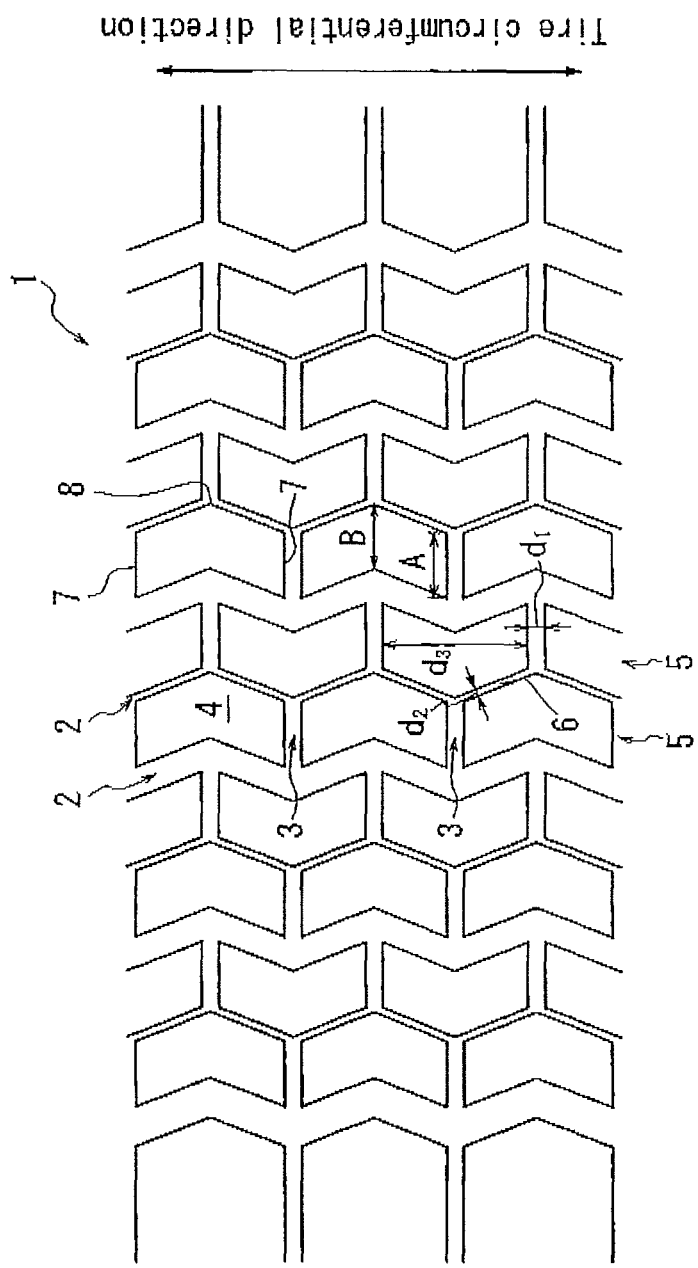
FIG. 5 is a development view of a part of a tread portion of a representative tire according to the present invention.
Figure 6:
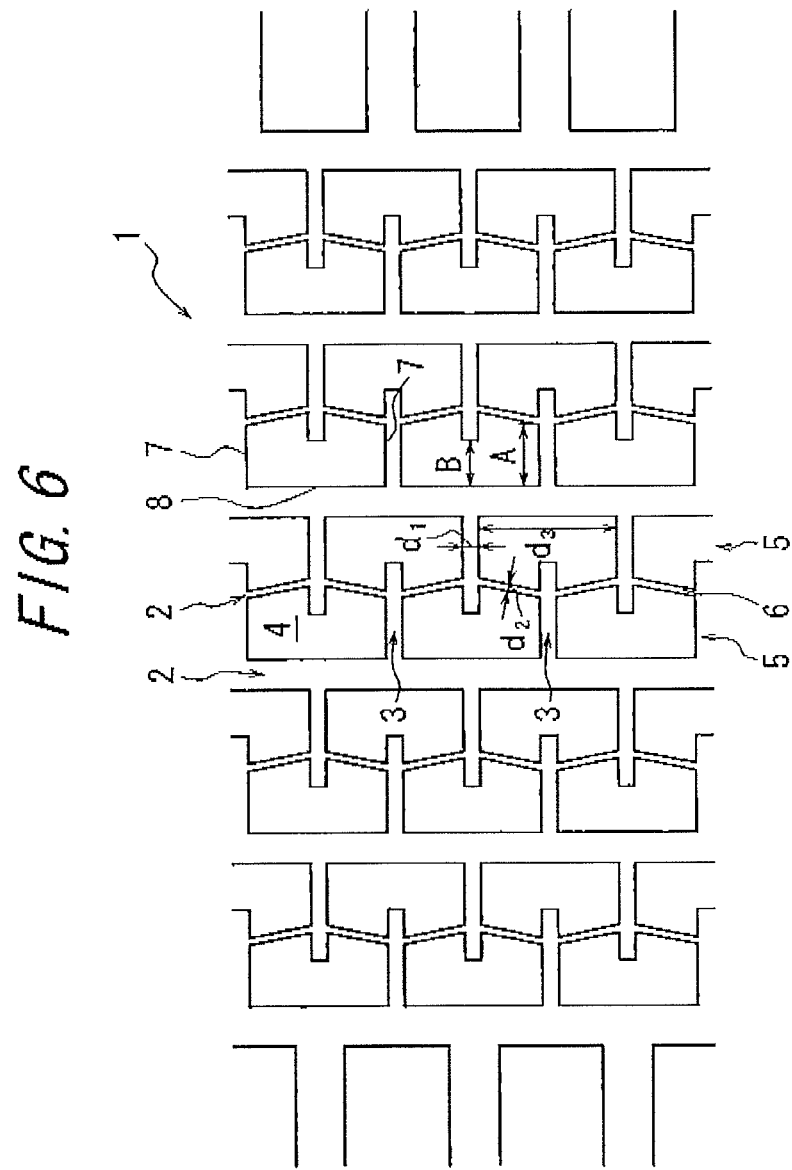
FIG. 6 is a development view of a part of a tread portion of yet another tire according to the present invention.
Figure 7:
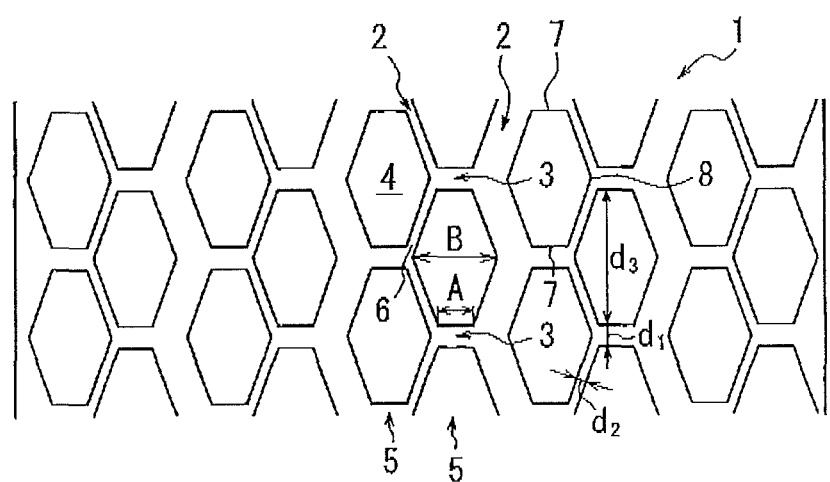
FIG. 7 is a development view of a part of a tread portion of yet another tire according to the present invention.
Figure 8:
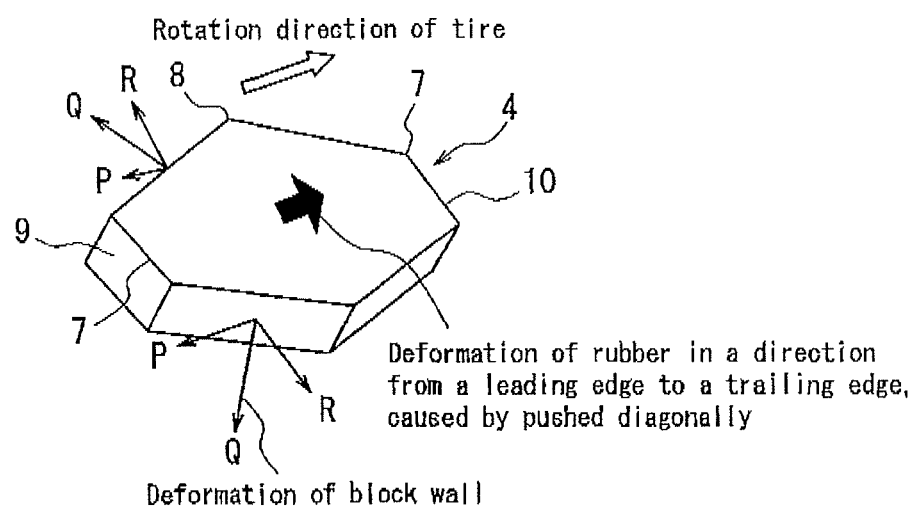
FIG. 8 is a perspective view of a block land portion as shown in FIG. 7 (the symbol Z represents deformation of rubber in a direction from a leading edge to a trailing edge, caused by being pushed diagonally).
Figure 10:
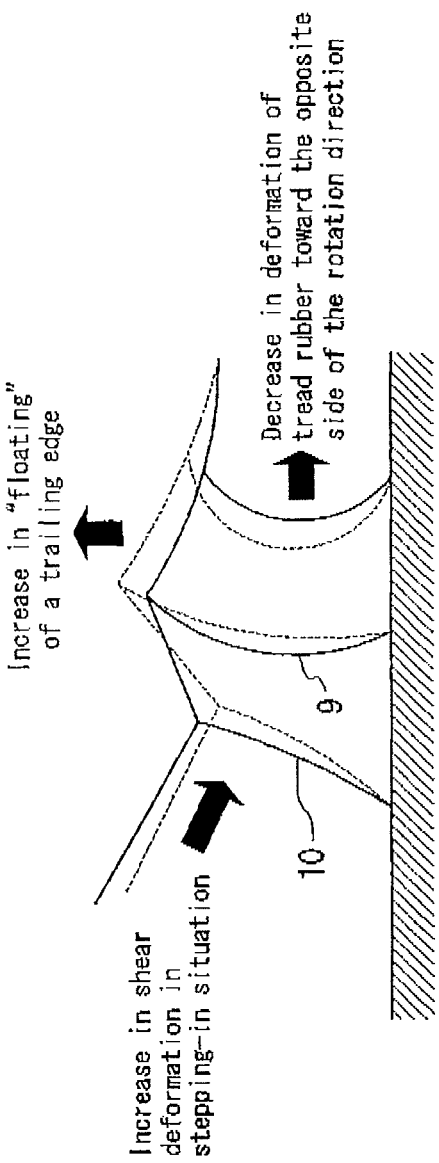
FIG. 10 is a view showing deformation in block land portions adjacent to each other when driving force is exerted thereon (symbol α represents increase in shear deformation in stepping-in situation, symbol β represents increase in "floating" of a trailing edge, and symbol γ represents decrease in deformation of tread rubber toward the opposite side of the rotation direction).
Figure 11:
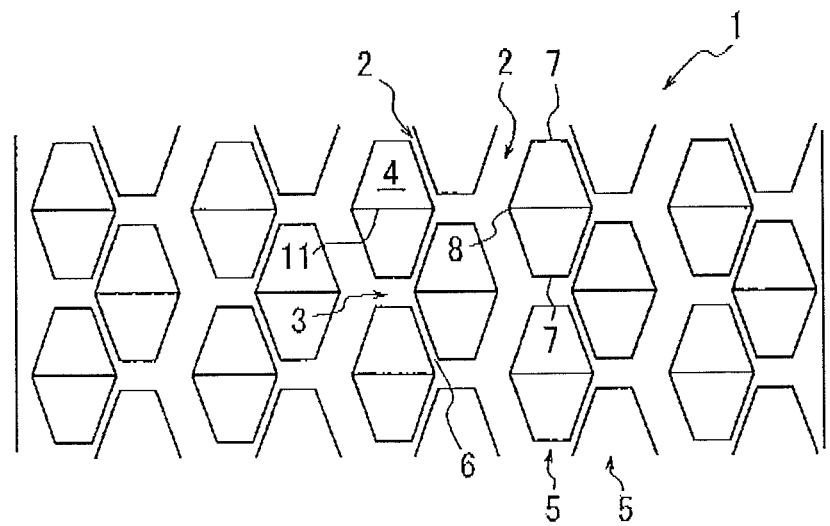
FIG. 11 is a development view of a part of a tread portion of yet another tire according to the present invention.
Figure 12:
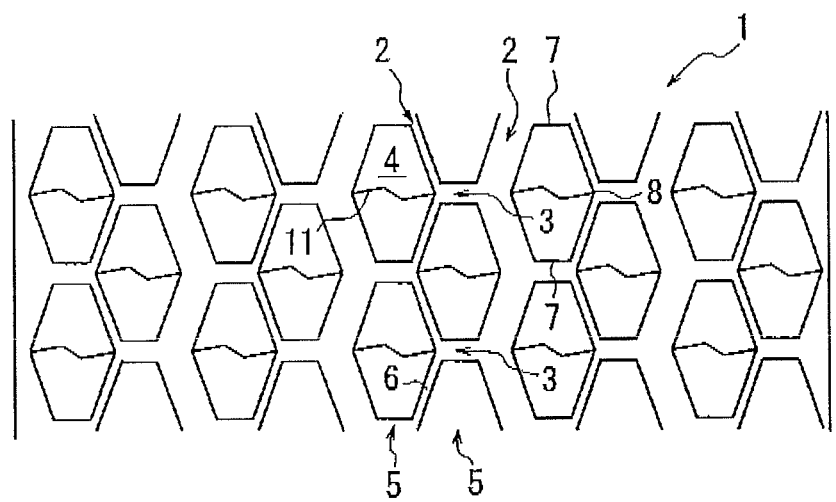
FIG. 12 is a development view of a part of a tread portion of yet another tire according to the present invention.
Figure 13:
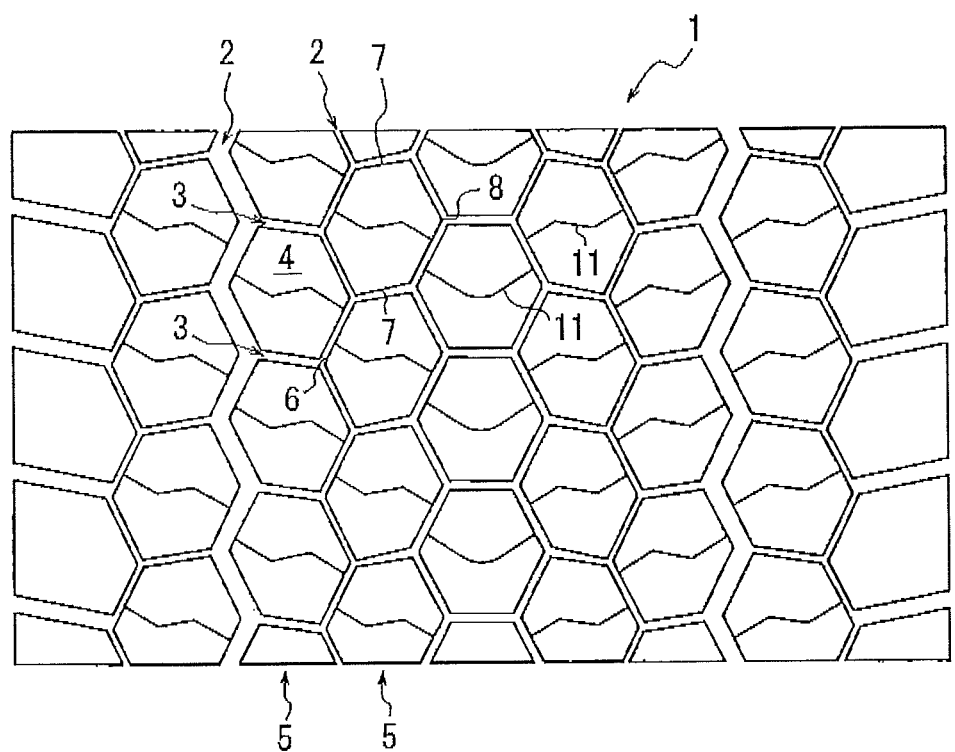
FIG. 13 is a development view of a part of a tread portion of yet another tire according to the present invention.

Hereinafter, an embodiment of the present invention will be described with reference to the drawings. FIG. 5 is a development view of a part of a tread portion of a representative tire according to the present invention. FIG. 6 and FIG. 7 are development views, respectively, of a part of a tread portion of yet other tires according to the present invention. FIG. 8 is a perspective view of a block land portion as shown in FIG. 7. FIG. 9(a) is a view showing a block land portion in contact with the ground due to being pushed horizontally with respect to a road surface. FIG. 9(b) is a view showing a block land portion in contact with the ground due to being pushed diagonally with respect to a road surface. FIG. 10 is a view showing deformation in block land portions adjacent to each other when driving force is exerted thereon. FIGS. 11 to 13 are development views of a part of a tread portion of yet other tires according to the present invention.

Figure 3:
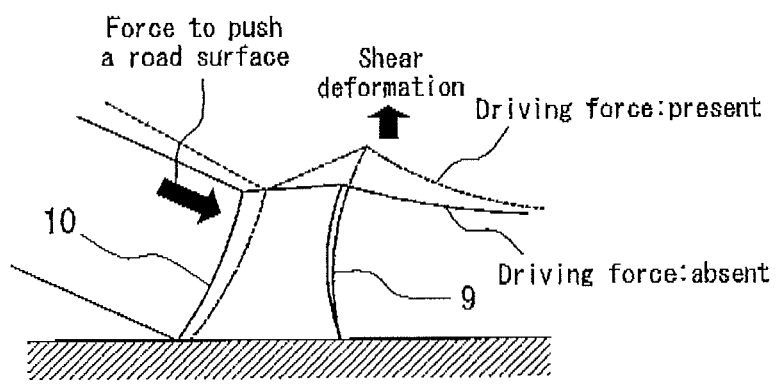
FIG. 3 is a view showing deformation in block land portions adjacent to each other when driving force is exerted thereon.

In the tire of the present invention, as shown in FIG. 5, in the tread portion 1, plural rows 5 of block land portions 4 are formed by demarcation by providing plural circumferential grooves 2 extending along tire circumferential direction and plural lateral grooves 3 for communicating adjacent two circumferential grooves 2,2 with each other. Further, in the structure above: in two rows 5,5 of block land portions 4 adjacent to each other with a circumferential groove 2 therebetween, among the rows 5 of block land portions 4, the respective rows 5 of block land portions 4 are disposed to be offset with respect to each other in the tire circumferential direction, and the extending direction of the groove portion 6 between the block land portions adjacent to each other in the tire widthwise direction is inclined with respect to the tire widthwise direction and tire circumferential direction. Moreover, a distance $d_2$ between the block land portions 4 adjacent to each other in the tire widthwise direction is shorter than a distance $d_1$ between the block land portions 4 adjacent to each other in the tire circumferential direction. Since the extending direction of the groove portion 6 between the block land portions adjacent to each other in the tire widthwise direction is inclined with respect to the tire widthwise direction and the tire circumferential direction and the distance $d_2$ between block land portions adjacent to each other in the tire widthwise direction is shorter than the distance $d_1$ between block land portions adjacent to each other in the tire circumferential direction, significant driving force exerted per unit area can be efficiently generated at the state of stepping-in situation already by reaction between the block land portions 4, as shown in FIG. 3, by utilizing the features that the groove portion 6 between the block land portions adjacent to each other in the tire widthwise direction is inclined with respect to the tire circumferential direction and the tire widthwise direction and that the distance between the block land portions is relatively small, with suppressing the expanding component of rubber (see FIG. 4) due to contact of the block land portions 4 adjacent in the tire circumferential direction with each other. It is preferable that the block land portions 4 adjacent to each other in the tire widthwise direction are disposed such that the block land portions of one row are offset in the tire circumferential direction with respect to the block land portions of the other row by a half pitch. Since the block land portions 4 are disposed in a half-pitch offset manner as described above, deformation force in which a block land portion collapse-deforms when the tire is rotated with a load exerted thereon can be effectively transferred by the block land portions 4 adjacent to each other in the tire widthwise direction, whereby driving force exerted per unit area of the tread portion 1 is lowered and wear of the block land portion 4 due to sliding phenomenon with respect to a road surface can be prevented. As a result, the tangent of change in shear force in the tire circumferential direction in a period from stepping-in situation to kicking-out situation is made relatively small and shear force in kicking-out situation, in which sliding wear may occur, is reduced, so that sliding wear is reduced. Further, in terms of effectively suppressing sliding wear, an inclination angle formed by the extending direction of the groove portion 6 between the block land portions adjacent to each other in the tire widthwise direction, with respect to the tire circumferential direction, is preferably in the range of 15° to 70°. In the present invention, the structure of the tread portion 1 of the tire according to the present invention is not limited to the structure as shown in FIG. 5 and other structures may be employed as long as the aforementioned conditions are satisfied. For example, as shown in FIG. 6, the length of the block land portion 4 in a section in the tire widthwise direction may have a shape in which the length is increased from the respective edge portions 7, 7 in the tire circumferential direction to the center portion 8 (and then shortened).

Figure 1:
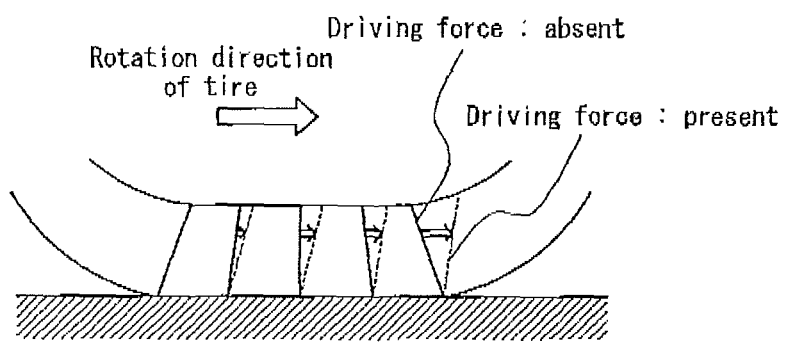
FIG. 1 is a view showing a relationship between presence/absence of driving force exertion and a shifted position of the tread portion.
Figure 2:
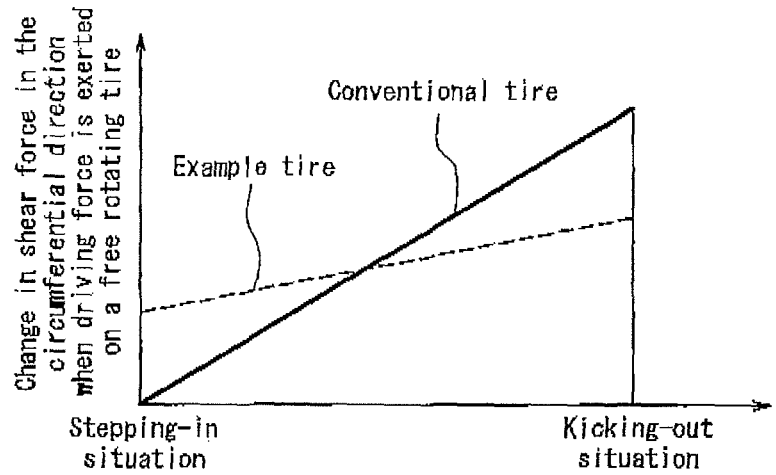
FIG. 2 is a view showing shear force applied from a road surface when driving force is exerted on the tread portion.

Yet further, as shown in FIG. 7 and FIG. 8, the length of the block land portion 4 in a section in the tire widthwise direction preferably increases from the respective edge portions 7, 7 in the tire circumferential direction of the block land portion 4 to the center portion 8 thereof. As a result of a keen study of wear in block land portions when a tire having block land portions, in particular, a tire for heavy load having relatively high aspect ratio is used as a driving tire, the inventor has made discoveries as described below. Specifically, when a block land portion is pushed against the ground and brought into contact therewith horizontally with respect to a road surface, the stress generated due to non-compressibility of rubber concentrates on the leading edge and the trailing edge of the block land portion, as shown in FIG. 9(a). However, in kicking-off situation when tread wear may occur due to sliding of a tread portion, since the tread portion is pushed against the ground in a slanted manner with respect to the road surface by a belt, the stress generated due to non-compressibility of the rubber is exerted on the center portion of the block land portion, as show in FIG. 9(b). In particular, in the case of a tire having a relatively high aspect ratio and relatively high belt rigidity, since the tread portion is strongly pushed against the ground in a slanted manner with respect to the road surface, the stress generated due to non-compressibility of the rubber is strongly exerted on the center portion of the block land portion accordingly. The force generated by this compressive deformation is exerted in the same direction as the moving direction of a vehicle and enhanced by driving force of an engine torque, thereby increasing sliding wear. In the structure described above where the length of the block land portion 4 of a section in the tire widthwise direction thereof is increased from the respective edge portions 7, 7 in the tire circumferential direction of the block land portion 4 toward the center portion 8 of the same block land portion 4, when the block land portion 4 is brought into contact with the ground in a slanted manner with respect to a road surface and whereby the compressive stress concentrates on the center region of the block land portion 4, as shown in FIG. 9(b), and a force to deform the rubber at the center portion of the block land portion 4 from the trailing edge 9 to the leading edge 10 is generated, a force Q to expand a wall inclined with respect to the tire circumferential direction on the trailing side of the block land portion 4, in a direction normal to the wall, is generated as shown in FIG. 8. A component of force R of the expanding force Q described above is generated at each of the left hand side and right hand side of the walls of the block land portion 4 and the respective components of force R opposite to each other are cancelled out between the block land portions 4. Further, the other component of force P of the force Q resists against the force to deform the rubber at the center portion of the block land portion 4 from the trailing edge 9 to the leading edge 10. As a result, excessive deformation of the block land portion 4 is suppressed and thus uneven wear and sliding wear of the block land portion 4 can be prevented. Further, as shown in FIG. 10, comparing the deformation (broken lines) of the block land portion 4 employing the shape and the arrangement as described above when driving force is exerted thereon, with the deformation (solid lines) of a conventional block land portion when driving force is exerted thereon, in the block land portion 4 of the resent invention, deformation of rubber toward the block trailing edge side is suppressed in stepping-in situation due to a mechanism similar to that in block kicking-out situation. However, this suppressed deformation acts, due to non-compressibility of rubber, in a direction which enhances the magnitude of "floating" of the trailing edge 9 of the block land portion 4 which has already been stepped in. Accordingly, the magnitude of shear deformation of the block land portion 4, which is to be stepped-in next, increases, whereby there is obtained a synergetic effect that shear force in stepping-in situation is enhanced, as shown in FIG. 2, whereas shear force in kicking-out situation, which significantly affects degree of wear, is lowered. In this case, the ratio of the length B in the tire widthwise direction of the center portion 8 of the block land portion 4 with respect to the length A in the tire widthwise direction of the edge 14 in the tire circumferential direction of the block land portion 4 is preferably in the range of 1:3 to 1:1.5. In a case where the ratio is out of the aforementioned range, deformation of the block land portion 4 may not be effectively prevented when the block land portion 4 is brought into contact with the ground in a slanted manner with respect to a road surface, whereby uneven wear and sliding wear of the block land portion 4 may occur.

Further, the respective groove portions 6 in one block land portion 4 facing the same circumferential groove 2, which groove portions 6 are between the one block land portion and the other block land portion adjacent to each other in the tire widthwise direction, are preferably inclined with respect to the tire equatorial plane in directions opposite to each other. If the extending direction of the aforementioned groove portions 6 between the block land portions adjacent to each other in the tire widthwise direction were to be inclined with respect to the equatorial plane in the same direction, although sliding wear would be effectively prevented for an input from a certain direction, an input from other directions would not be effectively addressed and sliding wear derived from the input from other directions would not be successfully prevented. Further, since the inclined extending directions of the groove portions between the block land portion adjacent to each other in the tire widthwise direction described above are complementarily combined, in arrangement, with the inclinations of the walls of the block land portion 4 resulted from the shape in which the length of the block land portion 4 in a section in the tire widthwise direction thereof is increased toward the center portion 8 of the block land portion 4, a block pattern can be designed without creating meaningless spaces in the tire widthwise direction, such that wear resistance performance is effectively demonstrated without marring either the structures or effects resulted from the aforementioned two inclinations. Accordingly, a pattern designing by combining the aforementioned block pattern with a second rib, a shoulder rib, a lug and the like is made easy.

Figure 4:
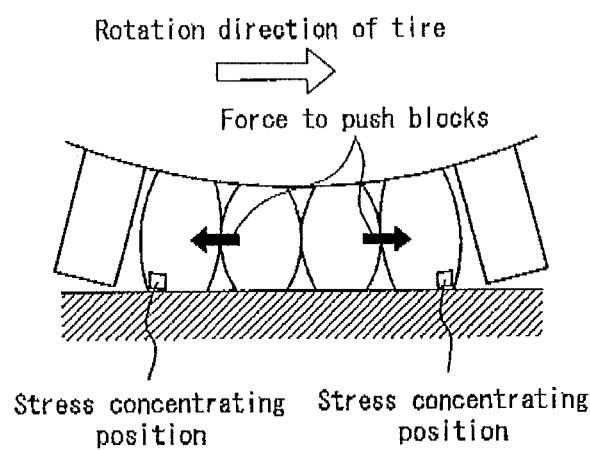
FIG. 4 is a view showing deformation in block land portions in a case where the block land portions adjacent in the tire circumferential direction are too close to each other.

Yet further, the ratio of a distance $d_1$ between block land portions adjacent to each other in the tire circumferential direction with respect to a distance $d_2$ between block land portions adjacent to each other in the tire widthwise direction is preferably in the range of 1:0.85 to 1:0.3 and more preferably in the range of 1:0.7 to 1:0.4. In a case where the ratio of a distance $d_2$ between block land portions adjacent to each other in the tire widthwise (circumference) direction with respect to a distance $d_t$ between block land portions adjacent to each other in the tire circumferential direction is larger than 1:0.3, although the distance $d_1$ between block land portions adjacent to each other in the tire circumferential direction is sufficient, the distance $d_2$ between block land portions adjacent to each other in the tire widthwise direction is too short. Due to this, the block land portions 4 adjacent to each other in the tire widthwise direction are brought into contact with each other when the tire is rotated with a load exerted thereon and deforming force to collapse-deform is not effectively transferred from one block land portion 4 to another block land portion 4 adjacent thereto, whereby shear force in the block land portion 4 is not effectively dissipated and sliding wear may be resulted. In a case where the ratio of a distance $d_2$ between block land portions adjacent to each other in the tire widthwise direction with respect to a distance $d_1$ between block land portions adjacent to each other in the tire circumferential direction is smaller than 1:0.85, although the distance $d_2$ between block land portions adjacent to each other in the tire widthwise direction is sufficient, the distance $d_1$ between block land portions adjacent to each other in the tire circumferential direction is too short. Accordingly, the block land portions 4 are in contact with each other in the tire circumferential direction when these block land portions 4 are brought into contact with a road surface, whereby deformation due to expansion of rubber occurs, as shown in FIG. 4 and wear resistance may deteriorate.

Yet further, the ratio of the length $d_1$ in the tire circumferential direction of the block land portion 4 with respect to a distance $d_1$ between block land portions 4 adjacent to each other in the tire circumferential direction is preferably in the range of 1:0.25 to 1:0.05 and more preferably in the range of 1:0.17 to 1:0.07. In a case where the ratio of a distance $d_i$ between block land portions 4 adjacent to each other in the tire circumferential direction with respect to the length $d_3$ in the tire circumferential direction of the block land portion 4 exceeds 1:0.05, the block land portions 4 adjacent in the tire circumferential direction contact with each other too close when these block land portions 4 collapse-deform in rotation of the tire with a load exerted thereon. Accordingly, as shown in FIG. 4, when the block land portions 4 of the tread portion 1 in contact with a road surface are pushed and deformed, the block land portions 4 adjacent in the tire circumferential direction contact with each other at the center of the tread portion 1 and push other block land portions 4 disposed on the outer side thereof toward the outer side in the tire circumferential direction, whereby these other block land portions 4 collapse-deform excessively both in the tire rotating direction and the direction opposite thereto. As a result, a force in the same direction as the direction in which driving force is exerted is increased at the trailing edge 9, possibly causing sliding wear due to such collapse-deformation as described above. In a case where the ratio of a distance between block land portions 4 adjacent to each other in the tire circumferential direction with respect to the length $d_3$ in the tire circumferential direction of the block land portion 4 is smaller than 1:0.25, the block land portions 4 adjacent in the tire circumferential direction are separated from each other too much, whereby shear force of the block land portion 4 adjacent to each other in the tire circumferential direction can no longer be dissipated with good balance by utilizing the shear force at the trailing edge 9 of the block land portion 4 and therefore sliding wear may occur.

Yet further, the distance $d_2$ between the block land portions adjacent to each other in the tire widthwise direction is preferably in the range of 1.0 to 5.0 mm and more preferably in the range of 1.5 to 3.5 mm. In a case where the distance $d_2$ between the block land portions exceeds 5.0 mm, the distance $d_2$ between the block land portions adjacent to each other in the tire widthwise direction is too long. As a result, deformation force to collapse-deform one block land portion 4 cannot be transferred to another block laud portion 4 adjacent thereto in the widthwise direction, whereby excessive collapse-deformation in the tire circumferential direction of the one block land portion is caused and wear due to sliding of the block land portion 4 may be resulted. In a case where the distance $d_2$ between the block land portions is shorter than 1.0 mm, the distance $d_2$ between the block land portions adjacent to each other in the tire widthwise direction is too short. As a result, the block land portions 4 adjacent in the tire widthwise direction contact with each other when the tire is rotated with a load exerted thereon and deformation force to collapse-deform one block land portion 4 cannot be effectively transferred to another block land portion 4 adjacent thereto in the widthwise direction, whereby excessive collapse-deformation is caused and wear due to sliding of the block land portion 4 may be resulted.

Yet further, the distance $d_1$ between the block land portions 4 adjacent to each other in the tire circumferential direction is preferably in the range of 3.0 to 10.0 mm and more preferably in the range of 4.0 to 8.0 mm. In a case where the distance $d_1$ between the block land portions adjacent to each other in the tire circumferential direction exceeds 10.0 mm, the distance $d_1$ between the block land portions adjacent to each other in the tire circumferential direction is too long. As a result, the ground-contact pressure of the block land portion 4 rises up excessively, possibly causing wear resistance to deteriorate. In a case where the distance $d_1$ between the block land portions adjacent to each other in the tire circumferential direction is shorter than 3.0 mm, the distance $d_1$ between the block land portions adjacent to each other in the tire circumferential direction is too short. As a result, the block land portions 4 contact with each other in the tire circumferential direction when these block land portions 4 are brought into contact with a road surface and deformation due to expansion of rubber as shown in FIG. 4 occurs, possibly causing wear resistance to deteriorate.

Yet further, as shown in FIG. 11 to FIG. 13, the block land portion 4 is preferably provided with a narrow groove 11 which communicates in the tire widthwise direction the two circumferential grooves 2, 2 each adjacent to the block land portion 4. By providing the block land portion 4 with an additional trailing edge 9, gripping force of the block land portion 4 as a whole can be enhanced, whereby torque from the engine can be efficiently converted into driving force. The narrow groove 11 may bend either linearly or in a curved manner in the block land portion 4.

Yet further, the narrow groove 11 provided in the block land portion 4 preferably opens to the circumferential grooves 2 at the center portion 8 of the block land portion 4. In a case where the narrow groove 11 opens in a region other than the center portion 8 of the block land portion 4, gripping force as the driving force can no longer be dissipated with good balance within the block land portion 4, whereby there is a possibility that torque from the engine cannot be efficiently converted into driving force.

Yet further, the length in the tire circumferential direction of the narrow groove 11 provided in the block land portion 4 is preferably in the range of 5 to 20% and more preferably in the range of 7 to 18% of the groove depth (depth in the radial direction) of the lateral groove 3. In a case where the length in the tire circumferential direction of the narrow groove 11 is shorter than 5% of the groove depth of the lateral groove 3, the length in the tire circumferential direction of the narrow groove 11 is too short. As a result, gripping force from the leading edge 10 toward the trailing edge 9 deteriorates to the level of gripping force observed in a case where no narrow groove is provided in the block land portion 4, possibly rendering provision of the narrow groove 11 meaningless. In a case where the length in the tire circumferential direction of the narrow groove 11 exceeds 20% of the groove depth of the lateral groove 3, the length in the tire circumferential direction of the narrow groove 11 is too long. As a result, the block land portions 4, each of which is sectioned into sub-portions by the narrow groove 11, can no longer transfer force by reaction between the block land portions 4, whereby excessive collapse-deformation may occur, followed by sliding wear due to the deformation. In order to obtain a satisfactory effect until the final stage of wear, the groove depth of the narrow groove 11 in the block land portion 4 is preferably 60 to 100% of the groove depth of the lateral groove 3.

The foregoing descriptions only explain a part of the embodiments of the present invention. The structures described above may be combined with each other or subjected to various modification, unless such combination or modification digresses the spirit of the present invention. For example, although the tire having the structure as shown in FIGS. 5 to 7, 11 and 12 is provided with at least one unit of block land portion rows 5 in the ground contact surface of the tread portion, wherein each unit includes two block land portion rows 5, there may be provided in the ground contact surface of the tread at least one unit of block land portion rows, each unit including three or more block land portion rows 5, and, for example, as shown in FIG. 13, there may be provided in the ground contact surface of the tread at least one unit of block land portion rows, each unit including five block land portion rows 5

EXAMPLES

Next, there were produced pneumatic tires according to the present invention (Example tires 1 to 8), pneumatic tires having conventional tread pattern (Conventional Example tire), and pneumatic tires having the same structure as the pneumatic tire of the present invention, except that the distance between the block land portions is beyond the scope of the present invention (the Comparative example tire), as test tires (pneumatic tires for heavy load having tire size of 495145R22.5), respectively, and performances thereof were evaluated as described below.

Examples tires 1 to 8 are pneumatic tires having tread portions corresponding to FIGS. 5, 6, 16, 7, 17, 11-13, respectively, and each including block land portions provided across the entity of the tread portion. The block land portions adjacent to each other in the tire widthwise direction are disposed such that the block land portions of one row are offset in the tire circumferential direction with respect to the block land portions of the other row by a half pitch. Further, the extending direction of the groove portion 6 between the block land portions adjacent to each other in the tire widthwise direction is inclined with respect to the tire widthwise direction. Moreover, a distance between the block land portions adjacent to each other in the tire widthwise direction is shorter than a distance between the block land portions adjacent to each other in the tire circumferential direction. Example tires 1 to 8 have characteristics as shown in Table 1, respectively.

Figure 14:
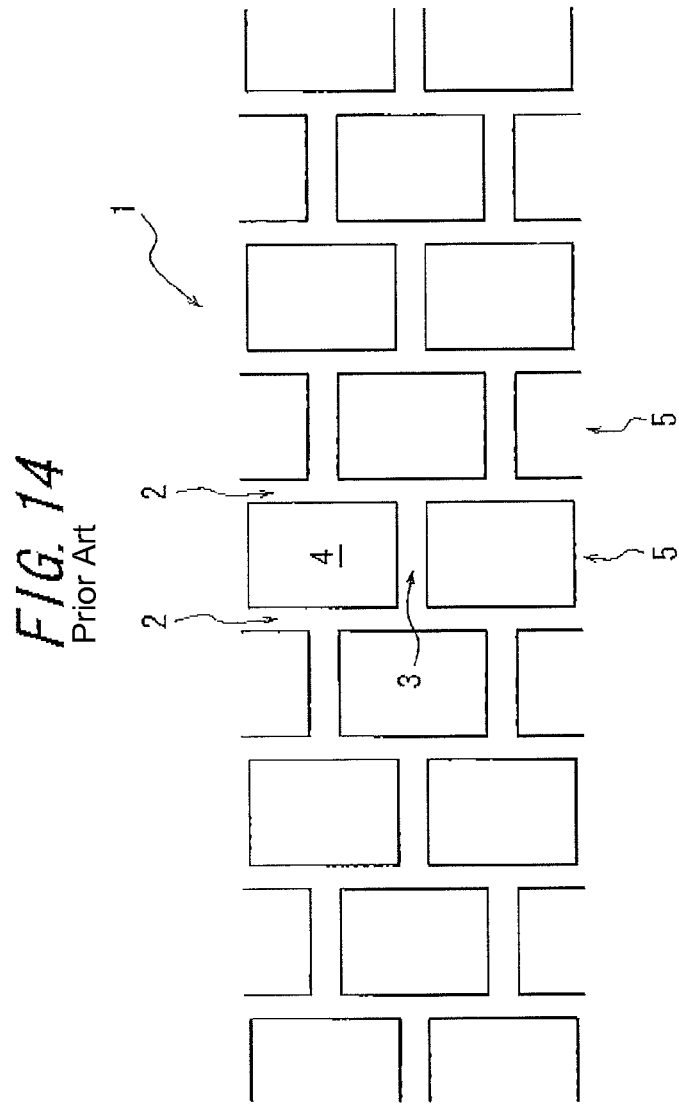
FIG. 14 is a development view of a part of a tread portion of Conventional Example tire.
Figure 15:
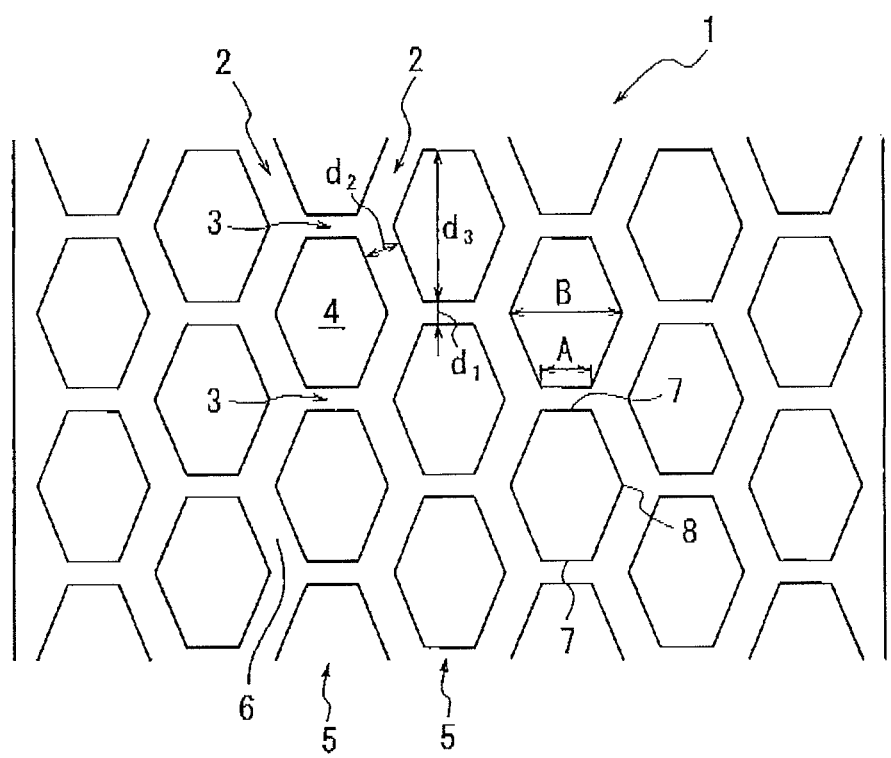
FIG. 15 is a development view of a part of a tread portion of Comparative Example tire.
Figure 16:
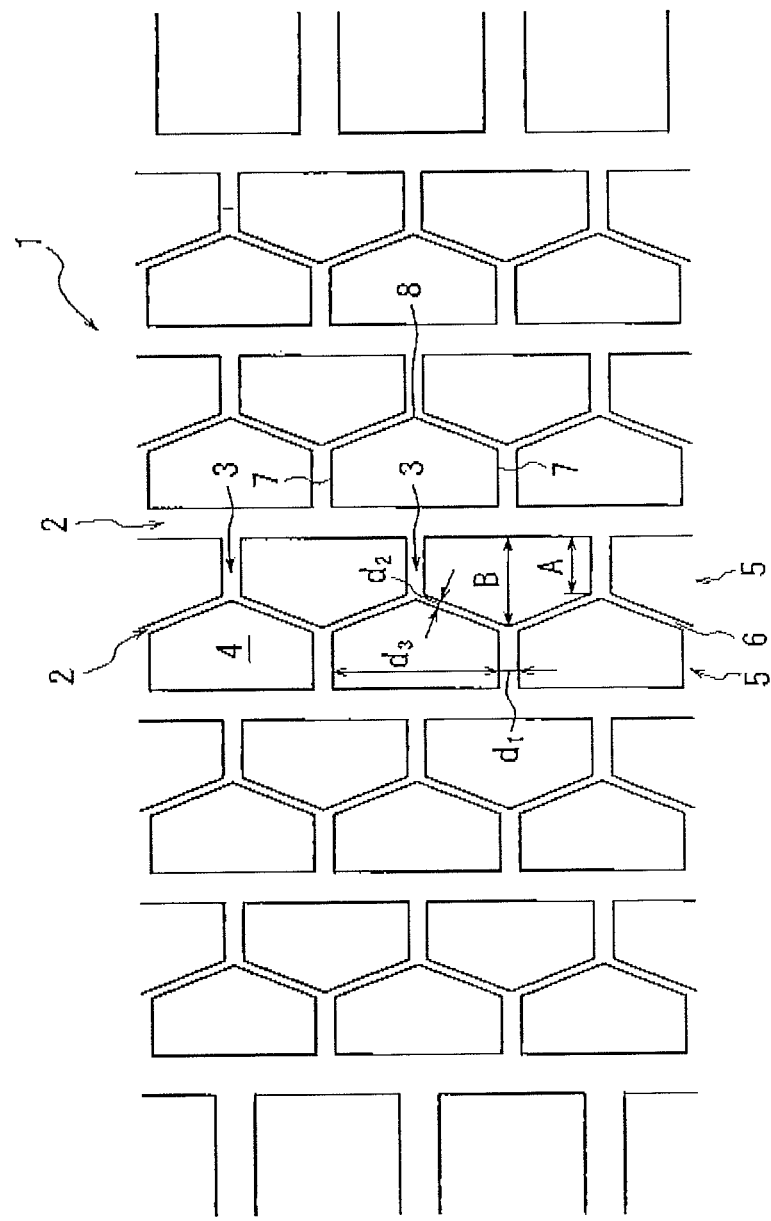
FIG. 16 is a development view of a part of a tread portion of Example tire 3.
Figure 17:
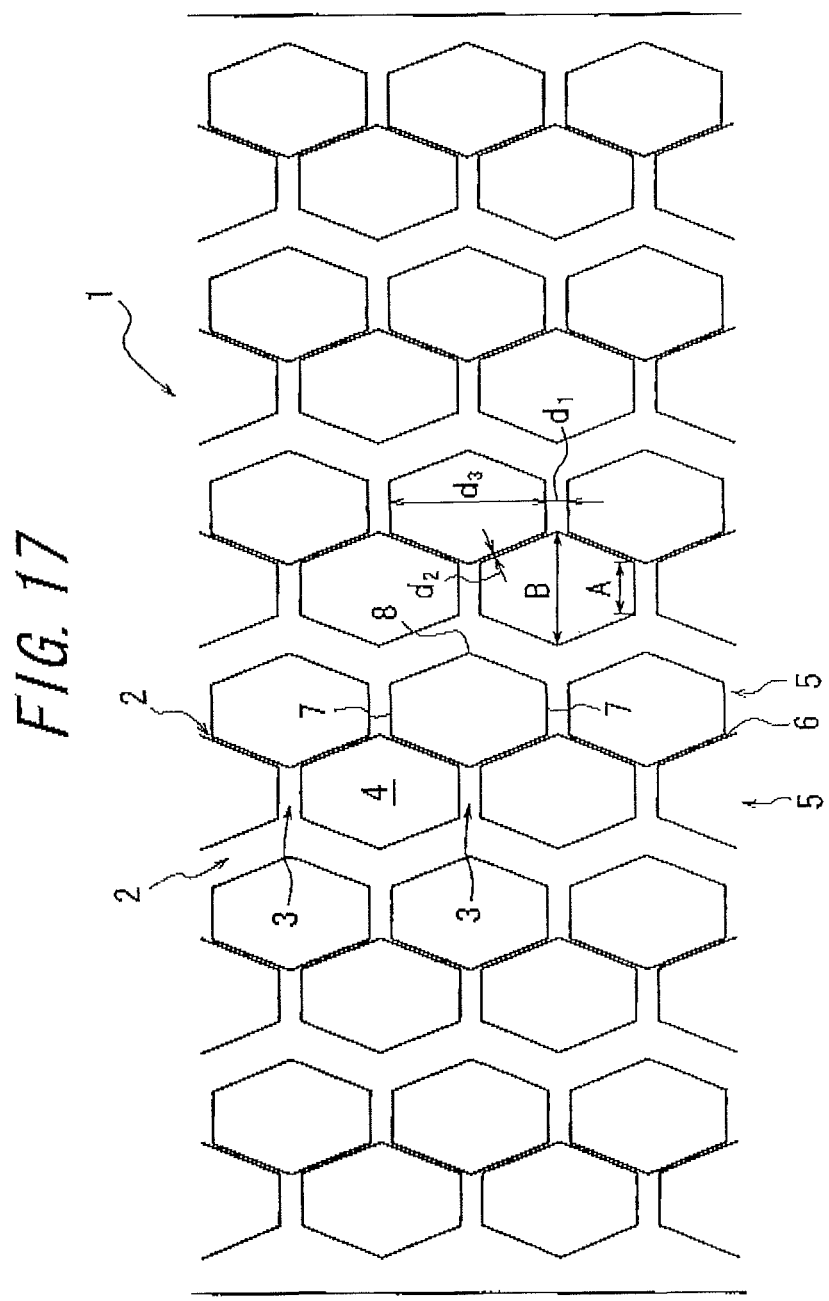
FIG. 17 is a development view of a part of a tread portion of Example tire 5.

As shown in FIG. 14, Conventional Example tire has a tread portion provided with quadrangular block land portions and has characteristics as shown in Table 1. As shown in FIG. 15, Comparative Example tire has a tread portion in which a distance between the block land portions adjacent to each other in the tire widthwise direction is longer than a distance between the block land portions adjacent to each other in the tire circumferential direction, and has the characteristics as shown in Table 1.

TABLE 1

|  | Conventional Example tire | Comparative Example tire | Example tire 1 | Example tire 2 | Example tire 3 |
|---|---|---|---|---|---|
| Corresponding FIG. | 14 | 15 | 5 | 6 | 16 |
| Length of block land portion in the circumferential direction | 60.0 mm | 60.0 mm | 60.0 mm | 60.0 mm | 60.0 mm |
| Length of edge portion in the tire circumferential direction of block land potion in the widthwise direction | 40.0 mm | 19.0 mm | 27.0 mm | 27.0 mm | 27.0 mm |
| Length of center portion of block land portion in the widthwise direction | 40.0 mm | 38.0 mm | 27.0 mm | 20.0 mm | 33.0 mm |
| Depth of lateral groove | 18.0 mm | 18.0 mm | 18.0 mm | 18.0 mm | 18.0 mm |
| Distance between the block land portions adjacent to each other in the tire widthwise direction | 10.0 mm | 10.0 mm | 3.0 mm | 3.0 mm | 3.0 mm |
| Depth of groove portion between block land portions adjacent to each other in the tire widthwise direction | 15.0 mm | 15.0 mm | 15.0 mm | 15.0 mm | 15.0 mm |
| Distance between the block land portions adjacent to each other in the tire circumferential direction | 7.0 mm | 7.0 mm | 7.0 mm | 7.0 mm | 7.0 mm |
| Inclination angle formed by the extending direction of the groove portion between the block land portions adjacent to each other in the tire widthwise direction, with respect to the tire circumferential direction | 0° | 20°/−20° | 20°/20° | 20°/0° | 20°/0° |
| Presence or absence of narrow groove | Absent | Absent | Absent | Absent | Absent |
| Width of narrow groove | — | — | — | — | — |
| Depth of narrow groove | — | — | — | — | — |
| Presence or absence of bent in narrow groove | — | — | — | — | — |
| Number of rows adjacent to each other in the tire circumferential direction | — | — | 2 | 2 | 2 |

|  | Example tire 4 | Example tire 5 | Example tire 6 | Example tire 7 | Example tire 8 |
|---|---|---|---|---|---|
| Corresponding FIG. | 7 | 17 | 11 | 12 | 13 |
| Length of block land portion in the circumferential direction | 60.0 mm | 60.0 mm | 60.0 mm | 60.0 mm | 60.0 mm |
| Length of edge portion in the tire circumferential direction of block land potion in the widthwise direction | 16.0 mm | 18.0 mm | 16.0 mm | 16.0 mm | 30.0 mm |
| Length of center portion of block land portion in the widthwise direction | 38.0 mm | 40.0 mm | 38.0 mm | 38.0 mm | 61.0 mm |
| Depth of lateral groove | 18.0 mm | 18.0 mm | 18.0 mm | 18.0 mm | 18.0 mm |
| Distance between the block land portions adjacent to each other in the tire widthwise direction | 3.0 mm | 0.8 mm | 3.0 mm | 3.0 mm | 1.8 mm |
| Depth of groove portion between block land portions adjacent to each other in the tire widthwise direction | 15.0 mm | 15.0 mm | 15.0 mm | 15.0 mm | 15.0 mm |
| Distance between the block land portions adjacent to each other in the tire circumferential direction | 7.0 mm | 7.0 mm | 7.0 mm | 7.0 mm | 4.0 mm |

TABLE 1-continued

| | | | | | |
|---|---|---|---|---|---|
| Inclination angle formed by the extending direction of the groove portion between the block land portions adjacent to each other in the tire widthwise direction, with respect to the tire circumferential direction | 20°/−20° | 20°/−20° | 20°/−20° | 20°/−20° | 27°/−27° |
| Presence or absence of narrow groove | Absent | Absent | Present | Present | Present |
| Width of narrow groove | — | — | 1.0 mm | 1.0 mm | 1.0 mm |
| Depth of narrow groove | — | — | 15.0 mm | 15.0 mm | 15.0 mm |
| Presence or absence of bent in narrow groove | — | — | Absent | Present | Present |
| Number of rows adjacent to each other in the tire circumferential direction | 2 | 2 | 2 | 2 | 5 |

Measurement was made by: assembling each of the test tires with a rim having size of 17.00×22.5 to obtain a tire wheel; mounting, as a driving wheel, each tire wheel thus obtained to a tractor vehicle for use in the tests; applying an air pressure of 900 kPa (relative pressure) and a load of 57 kN to the tires; and measuring wear amount in center portion of block land portion after running the vehicle for 50000 km on the highway. The wear resistance was then evaluated by: using the wear amount by the Comparative Example tire as the reference value and expressing the wear amount of other tires as relative values thereto (comparing Example tire: 100), and comparing the results thus obtained. The smaller value of the wear amount represents the better wear resistance. The results are shown in Table 2,

TABLE 2

| | Corresponding FIG. | Wear amount in center portion of block land portion |
|---|---|---|
| Conventional Example tire | 14 | 100 |
| Comparative Example tire | 15 | 93 |
| Example tire 1 | 5 | 83 |
| Example tire 2 | 6 | 83 |
| Example tire 3 | 16 | 79 |
| Example tire 4 | 7 | 76 |
| Example tire 5 | 17 | 86 |
| Example tire 6 | 11 | 71 |
| Example tire 7 | 12 | 74 |
| Example tire 8 | 13 | 67 |

As is obvious from the results shown in Table 2, due to the optimization of distance between the block land portions adjacent to each other in the tire circumferential direction and widthwise direction, wear amount in center portion of block land portion was smaller in the tires of Examples 1 to 8, as compared with the tires of Conventional Example and Comparative Example. Further, due to optimization of shape of block land portion, in the tires of Examples 3, 4, and 6 to 8, wear amount were particularly small and wear resistance is effectively enhanced. In Example tires 6 to 8, due to the enhancement of gripping force by providing narrow groove in block land portion, in particular, wear resistance is improved, as compared with the tires of Examples 1 and 2.

INDUSTRIAL APPLICABILITY

As is obvious from the foregoing descriptions, according to the present invention, it is possible to provide a tire, in which wear resistance has been enhanced by optimizing the shape and location of the block land portions.

EXPLANATION OF REFERENCE NUMERALS

1 Tread portion
2 Circumferential groove
3 Lateral groove
4 Block land portion
5 Rows of block land portion
6 Groove portion between block land portions adjacent to each other in the tire widthwise direction
7 Edge portion in the tire circumferential direction of block land potion
8 Center portion of block land potion
9 Trailing edge
10 Leading edge
11 Narrow groove

The invention claimed is:

1. A tire having plural rows of block land portions formed by demarcation by providing at least three circumferential grooves extending along tire circumferential direction and plural lateral grooves each in communication with a pair of adjacent two circumferential grooves of the at least three circumferential grooves;
in at least two rows of block land portions adjacent to each other with a circumferential groove therebetween, among the rows of block land portions, the respective rows of block land portions are disposed to be offset with respect to each other in the tire circumferential direction;
the extending direction of a narrow groove portion of the circumferential grooves each between the block land portions adjacent to each other in the tire widthwise direction is inclined with respect to the tire widthwise direction and tire circumferential direction; and
a distance between the block land portions adjacent to each other in the tire widthwise direction is shorter than a distance between the block land portions adjacent to each other in the tire circumferential direction,
wherein the ratio of the length in the circumferential direction of a block land portion with respect to a distance between block land portions adjacent to each other in the tire circumferential direction is in the range of 1:0.17 to 1:0.05, and
the ratio ($d_1$:$d_2$) of a distance ($d_2$) between block land portions adjacent to each other in the tire widthwise direction and a distance ($d_1$) between block land portions adjacent to each other in the tire circumferential direction is in the range of 1:0.7 to 1:0.4.

2. The tire of claim 1, wherein a length of each block land portion in a section in the tire widthwise direction thereof increases from the respective ends in the tire circumferential direction of the block land portion toward the center portion thereof.

3. The tire of claim 1, wherein the distance between the block land portions adjacent to each other in the tire widthwise direction is in the range of 1.5 to 3.5 mm.

4. The tire of claim 1, wherein the distance between the block land portions adjacent to each other in the tire circumferential direction is in the range of 3.0 to 10.0 mm.

5. The tire of claim 1, wherein the block land portion is provided with a narrow groove (11) which is in communication, in the tire widthwise direction, with the two circumferential grooves each adjacent to the block land portion.

6. The tire of claim 5, wherein the narrow groove (11) provided in the block land portion opens to the circumferential grooves at the center portion of the block land portion.

7. The tire of claim 5, wherein the length in the tire circumferential direction of the narrow groove provided in the block land portion is in the range of 5 to 20% of the groove depth of the lateral groove.

\* \* \* \* \*